United States Patent
De Battisti et al.

(10) Patent No.: US 7,407,591 B2
(45) Date of Patent: Aug. 5, 2008

(54) PROCESS FOR THE REDUCTION OF ACTIVATED CHROMIUM OXIDE CATALYST

(75) Inventors: Achille De Battisti, Ferrara (IT); Pier Luigi Di Federico, Ferrara (IT); Dinara Iantilina, Bashkortostan (RU); Christian Urgeghe, Pontelagoscuro (IT)

(73) Assignee: Basell Polyolefine GmbH, Wesseling (DE)

( * ) Notice: Subject to any disclaimer, the term of this patent is extended or adjusted under 35 U.S.C. 154(b) by 106 days.

(21) Appl. No.: 11/587,332

(22) PCT Filed: Apr. 21, 2005

(86) PCT No.: PCT/EP2005/004403

§ 371 (c)(1),
(2), (4) Date: Oct. 19, 2006

(87) PCT Pub. No.: WO2005/105306

PCT Pub. Date: Nov. 10, 2005

(65) Prior Publication Data

US 2007/0219085 A1    Sep. 20, 2007

Related U.S. Application Data

(60) Provisional application No. 60/569,143, filed on May 7, 2004.

(30) Foreign Application Priority Data

Apr. 30, 2004  (EP) ................... 04101864

(51) Int. Cl.
*B01J 37/00* (2006.01)
(52) U.S. Cl. ............................... 210/757
(58) Field of Classification Search .............. 210/757
See application file for complete search history.

(56) References Cited

U.S. PATENT DOCUMENTS

| | | | |
|---|---|---|---|
| 3,784,669 A | 1/1974 | Elges, III et al. |
| 4,284,527 A | 8/1981 | Pullukat et al. |
| 4,814,308 A | 3/1989 | Konrad et al. |
| 5,189,123 A | 2/1993 | Gropper et al. |
| 5,245,121 A | 9/1993 | Gall et al. |
| 5,641,842 A | 6/1997 | McDaniel et al. |
| 6,147,171 A | 11/2000 | Rohde |
| 6,221,002 B1 | 4/2001 | James |
| 6,416,251 B1 | 7/2002 | Nayak et al. |
| 2002/0049361 A1 | 4/2002 | Chowdhury |

FOREIGN PATENT DOCUMENTS

| | | |
|---|---|---|
| BE | 861275 | 3/1978 |
| DE | 2540279 | 3/1977 |
| DE | 3635710 | 4/1988 |
| EP | 166157 | 1/1986 |
| EP | 429937 | 6/1991 |
| JP | 52097369 | 8/1977 |

OTHER PUBLICATIONS

T. Wang et al., "High-temperature reduction of chromium (VI) in solid alkali," *Journal of Hazardous Materials B112*, p. 63-69 (2004) XP002348346.

*Primary Examiner*—Chester T Barry
(74) *Attorney, Agent, or Firm*—William R. Reid

(57) ABSTRACT

Process for the reduction of a hexavalent chromium oxide based catalyst comprising contacting, under mixing conditions, a hexavalent chromium oxide based catalyst, with a molar excess, in respect of the chromium species, of a solid reducing agent and subjecting the mixture to a temperature in the range 30-1000° C. The process is simple, involves low costs and allows to obtain a permanently reduced chromium catalyst that can be disposed without toxicity risks.

5 Claims, No Drawings

PROCESS FOR THE REDUCTION OF ACTIVATED CHROMIUM OXIDE CATALYST

This application is the U.S. national phase of International Application PCT/EP2005/004403, filed Apr. 21, 2005, claiming priority to European Patent Application 04101864.9 filed Apr. 30, 2004, and the benefit under 35 U.S.C. 119(e) of U.S. Provisional Application No. 60/569,143, filed May 7, 2004; the disclosures of International Application PCT/EP2005/004403, European Patent Application 04101864.9 and U.S. Provisional Application No. 60/569,143, each as filed, are incorporated herein by reference.

The present invention relates to an improved process for reducing activated chromium oxide based catalysts. In particular the present invention relates to a high temperature process for reducing the hexavalent chromium oxide catalysts.

Olefin polymerization catalysts based on oxidized chromium compounds which are fixed on porous solids, called Phillips catalysts, are known in the art and are employed in particular for polymerizing ethylene or copolymerizing ethylene with 1-alkenes. The polymers are important starting materials for use in various sectors such as preparation of all types of sheets and shaped articles.

Described simply, the Phillips catalysts are generally obtained by impregnating a carrier substance with a chromium-containing solution such as chromium(III) nitrate in water or methanol, chromium(III) acetate in water or methanol, evaporating the solvent and activating the solid under oxidizing conditions, for example in an oxygen-containing atmosphere, at 400 to 1000° C. to generate chromium (VI) species.

Due to various and unforeseeable causes, it can happen that the defined process conditions for the activation are not respected and that the catalyst activation process consequently fails. In such a case, the result is a catalyst batch—containing anyway a major amount of Cr (VI) —that cannot be used to produce polyethylene and needs to be disposed.

As Cr(VI) species are highly toxic, it is mandatory to convert them to non-toxic chromium species at a lower valence state (usually trivalent or divalent) species before the disposal. Up to now the most applied technique for converting the chromium species in the catalyst batch residuals has been the incineration which involves the use of a special very high-temperature incinerator capable to thermally reduce the active Cr (VI) to the inert Cr (III) or lower valence state. However, the Cr (III) species are not thermally stable and under certain conditions tend to transform again in Cr (VI). Moreover, as the special incinerator is very expensive, the disposal under this method involves high investment costs that, in view of the limited use of the apparatus, would be hardly amortised.

Reduction of the Cr(VI) species in the catalyst to be used in the polymerization is known. The Phillips catalysts obtained by oxidation are generally not active in polymerization within a certain timespan, usually a few minutes, even if they are already in contact with the monomer. The polymerization starts only after an induction period, and the catalyst granules can become surrounded with a protective polymer sheath. With the aim of shortening the induction period, the catalysts obtained by oxidation are (partially) reduced with carbon monoxide under a temperature in the range 350-450° C. as described for example in U.S. Pat. No. 5,641,842. Such a method, if used for a catalyst to be disposed, would avoid the use of a special incinerator (because the reduction would take place at lower temperature) but would involve the use of large excess (high pressure) of reducing agents in order to have a high conversion. This method requires additional apparatuses for the recycling of CO that, being highly toxic leads to considerable safety costs in industrial polymerization. Moreover, once the CO is no longer in contact with the catalyst phenomena of re-oxidation are possible. The same considerations can apply to the reduction process disclosed in U.S. Pat. No. 6,147,171 in which liquid or gaseous unsaturated organic compounds, such alkenes, alkynes and aldehydes are used. In U.S. Pat. No. 5,245,121 CrVI oxide materials are subject to an oxidizing step at temperatures of at least 500° C. with free oxygen in the presence of cabonaceus material as possibly reducing agent. In Jp 52-097369 reduction of Phillips catalyst is carried out in a fluidized bed at least 400° C. by in situ production of CO starting from carbon powder and water. In U.S. Pat. No. 6,416,251 CrVI oxide materials are sintered at high temperature in the presence of metal oxides and carbon. In U.S. Pat. No. 6,221,002 ascorbic acid, preferably in solution or slurry form, is used as reducing agent at ambient temperature. US2002/049361 discloses the use of $FeSO_4$ as reducing agent in the treatment of Cr(VI) containing waste. In U.S. Pat. No. 3,784,669 is described a process for reducing chromium and cupper species by using water solution of sugar at room temperature. However, the need disposal big quantity of solution would considerably increase the cost of the Cr(VI) species handling.

The applicant has now surprisingly found a process for the reduction of Cr (VI) species that is simple, effective, cheap and ensure that the catalyst remains in the reduced form for a long time.

The said process comprising contacting, under mixing conditions, a hexavalent chromium oxide based catalyst, with a molar excess, in respect of the chromium species, of a solid reducing agent and subjecting the so obtained mixture to a temperature in the range 30-1000° C.

The temperature is kept preferably in the range 30-900° C. and in particular in the range 50-800° C. The temperature range of the invention allows to reach the desired extent of conversion even without using expensive special furnaces. It is within the ordinary skills of the expert in the art to choose the most appropriate reaction temperature taking into consideration various factors such as the time necessary (which is higher at lower temperature) to reach the targeted conversion, energy consumption, and in particular the characteristics of the reducing agent such as reactivity, reducing power, thermal stability etc. Favourable results have been obtained for example using carbon as reducing agent (relatively poorly reactive and thermally stable) at 600° C. for 2 hours and at 700° C. for 1 hour. Much lower temperature (around 100° C.) have been used for example with reducing agents more reactive such as sucrose. It is also possible letting the reduction occur not just at a fixed temperature but, in a variable temperature program. For this purpose, the Phillips catalyst to be reduced can be brought into contact with the reducing agent at low temperature, and the temperature is raised, for example linearly with heating rates of 0.5° C. to 50° C./min, preferably 1 to 10° C./min.

As mentioned above, the reducing agent is solid at room temperature and may remain solid also at the reduction temperature. Preferably however, the reducing agent melts during the reduction thereby gaining higher mobility and capability to interact with the solid catalyst. In alternative, the solid reducing agent can be used together with small amounts of solvents acting as carriers for veicholating the reducing agent into the catalyst pores. The amounts of such solvents should be such as to create at maximum only very concentrate solutions of the reducing agent not able to solve the catalyst. Small amounts of liquid reducing agents such as hydrazine, could be used as a further reducing/vehicular agent.

The reducing agent comprises at least one of the following compounds FeS, $FeSO_4$, $Cu°$, carbon, hydroquinone, carbohydrates such as monosaccharides, (glucose, fructose) disaccharides (sucrose) or polysaccharides. Of course, combination of two or more reducing agents is also possible. The preferred solid reducing agents are carbon and sucrose. The reducing agent can be used as such or be generated in situ by the use of appropriate precursors able to transform in the reducing agents of the invention under the effect of the temperature.

The molar amount of reducing agent or precursor thereof is in excess in respect of the $Cr^{VI}$ species. When C is used as reducing agent interesting results have been obtained by using a C/total catalyst weight ratio ranging from 0.5 to 10 preferably from 0.6 to 5. The reduction time can vary from a few minutes to several hours or more. Preferably, it ranges from 0.5 to 5 hours. When the color of reducing agent is not too dark the extent of reduction can be followed by visual inspection of the catalyst system color. The color of the initial activated catalyst system is generally orange, indicating the presence of hexavalent chromium. The color of the reduced catalyst system is blue, indicating that all or substantially all of the initial hexavalent chromium has been reduced to a lower oxidation state, generally the divalent or trivalent state.

When the color of the reducing agent interferes, the extent of the reduction can be checked via the method disclosed in the experimental section.

The applicant found to be fundamental the fact that the continuous mixing is applied in order to ensure that the species come into contact. Preferably, the mixing is applied through a continuous mixing reactor. It is known in the art that mixing in these reactors can be imparted by an internal stirrer or provided by a rotation of the reactor itself. It is also possible to generate the mixing through a fluidization mean such as a hot nitrogen flow. It is of course important to ensure that the reactor is sealed to avoid possible introduction of oxidizing agents (oxygen) in the reaction ambient. Also the use of compounds that can generate, upon the temperature increase, species that can react with, or substantially limit the effect of, the reducing agent should be generally avoided. Preferably, an inert gas such as nitrogen or argon is used in the reactor.

As mentioned above, the a hexavalent chromium oxide based catalyst is, as a rule, a conventional Phillips catalyst prepared by oxidation, as described, for example, in DE-A 25 40 279 or EP-A 0 429 937. Described simply, it is generally obtained by impregnating a carrier substance with a chromium-containing solution, such as chromium(III) nitrate in water or methanol, chromium(III) acetate in water or methanol, or chromium(VI) oxide in water, evaporating the solvent and heating the solid under oxidizing conditions, for example in an oxygen-containing atmosphere, at 400 to 1000° C. This oxidation can take place in the presence of suitable fluorinating agents, for example ammonium hexafluorosilicate. The carrier material is normally a porous inorganic solid, which may also contain hydroxyl groups. Examples of these solids are, alumina, silica (silica gel), titanium dioxide or mixed oxides thereof, or aluminum phosphate. Other suitable carrier materials can be obtained by modifying the pore surface with compounds of the elements boron (BE-A-861,275), aluminum (DE-A 36 35 710), silicon (EP-A 0 166 157), phosphorus (DE-A 36 35 710) or titanium (U.S. Pat. No. 4,284,527). The carrier material can be treated under oxidizing or nonoxidizing conditions at from 200 to 1000° C., in the presence or absence of fluorinating agents such as ammonium hexafluorosilicate.

The following examples are given to illustrate and not to limit the invention itself.

Characterization

The percentage of residual Cr(VI) in the mixture is determined via the measurement of the absorbance at 578 nm of the complex between Cr(VI) species and methyl-isobutyl-ketone (MIBK) compared with the values of a calibration line obtained from standard MIBK solutions having a known amount of Cr(VI).

According to this method a sample containing about 0.2 g of originally introduced catalyst are added to 5 ml of 2M NaOH. The mixture is then placed in the hot bath for 10 min. and 1 ml of the so obtained solution is mixed with 4 ml of $H_2O$ and subsequently with 0.3 ml of 6M $HNO_3$ that is added to get the pH of the solution about 7.

After, that additional 0.53 ml of 6M $HNO_3$ are added to get pH=1~2 and then 3.18 ml of MIBK and 0.53 ml of 3% $H_2O_2$ were added and shaked.

The value of the absorbance peak height at 578 (determined by subtracting the base line value from the maximum peak value) is then corrected with the dilution factor and then compared with the calibration line to get the final result.

EXAMPLE 1

A sample of 1 g of catalyst (containing 20000 ppm Cr(VI)) and 0.8 g of carbon was placed in a continuous mixing reactor with a top screw cap. The reactor, filled with argon, was then placed in a furnace at 600° C. for 1 hour. At the end the sample was collected and the residual CrVI determinated. The amount of non-reduced Cr (VI) was found to be about 45 ppm.

EXAMPLE 2

Example 1 was repeated with the difference that reduction was performed at 600° C. for two hours. The amount of non-reduced Cr (VI) was found to be 45 ppm.

EXAMPLE 3

Example 1 was repeated with the difference that reduction was performed at 700° C. for 1 hour. The amount of non-reduced Cr (VI) was found to be 70 ppm.

EXAMPLE 4

Example 1 was repeated with the difference that the mixture was further added with 0.5 gr of $NH_2NH_2H_2SO_4$. The non reduced Cr (VI) was virtually absent (less than 20 ppm).

COMPARISON EXAMPLE 5

A sample of 1 g of catalyst and 0.8 g of carbon was placed into a porcelain crucible (no mixing) which is then placed in a furnace at 600° C. for 1 hour. The amount of non-reduced Cr (VI) was found to be 23.2% of initial amount.

EXAMPLE 6

A sample of 2 g of catalyst and 1 g of sucrose was placed together with a few drops of water in a continuous mixing reactor with a top screw cap. The reactor, filled with argon, was then placed in a furnace at 100° C. for 1 hour. At the end the sample was collected and the residual CrVI determinated. The amount of non-reduced Cr (VI) was below 20 ppm.

EXAMPLE 7

Example 7 was repeated with the difference that the sample was treated for 1 h at 100° C., then 1 h at 500° C. and then 1 h at 600° C. At the end the sample was collected and the residual CrVI determined. The amount of non-reduced Cr (VI) was 30 ppm.

EXAMPLE 8

Example 8 was repeated with the difference that the sample was treated for 1 h at 100° C., then 1 h at 300° C. and then 1 h at 400° C. At the end the sample was collected and the residual CrVI determined. The amount of non-reduced Cr (VI) was below 20 ppm.

The invention claimed is:

1. A process for the reduction of a conventional Phillips catalyst comprising a chromium species, the process comprising contacting, under mixing conditions, said conventional Phillips catalyst, with a molar excess, in respect of the chromium species, of a solid reducing agent selected from monosaccharides, disaccharides or polysaccharides and subjecting the so obtained mixture to a temperature in the range of from 50 to 1000° C.

2. The process according to claim 1 wherein the solid reducing agent is selected from disaccharides, and the temperature ranges from 50 to 300° C.

3. The process according to claim 1 wherein the solid reducing agent is selected from glucose, fructose or sucrose.

4. The process according to claim 3 wherein the solid reducing agent is sucrose.

5. The process according to claim 1 carried out in a continuous mixing reactor.

* * * * *